US006140904A

United States Patent [19]

Jungst et al.

[11] Patent Number: 6,140,904

[45] Date of Patent: Oct. 31, 2000

[54] THERMAL DISCONNECT FOR HIGH-TEMPERATURE BATTERIES

[75] Inventors: Rudolph George Jungst; James Rudolph Armijo, both of Albuquerque, N. Mex.; Darrel Richard Frear, Austin, Tex.

[73] Assignee: Sandia Corporation, Albuquerque, N. Mex.

[21] Appl. No.: 09/265,312

[22] Filed: Mar. 9, 1999

Related U.S. Application Data

[63] Continuation-in-part of application No. 08/950,390, Oct. 14, 1997.

[51] Int. Cl.[7] .................... H01H 37/76; H02H 5/04

[52] U.S. Cl. .................... 337/402; 337/401; 337/405; 337/407; 361/103

[58] Field of Search .................... 337/298, 401, 337/402, 403, 405–407, 411, 416; 361/103, 104; 29/623

[56] References Cited

U.S. PATENT DOCUMENTS

| | | | |
|---|---|---|---|
| 2,908,896 | 10/1959 | Homma | 340/514 |
| 3,043,937 | 7/1962 | Milton et al. | 337/405 |
| 3,198,914 | 8/1965 | Baran et al. | 37/405 |
| 3,436,712 | 4/1969 | Heaney | 337/405 |
| 4,189,697 | 2/1980 | Hara | 337/407 |
| 4,198,617 | 4/1980 | Hara | 337/403 |
| 4,441,093 | 4/1984 | Okazaki | 337/404 |
| 4,451,814 | 5/1984 | Barry et al. | 337/407 |
| 4,494,104 | 1/1985 | Holmes | 337/403 |
| 4,622,534 | 11/1986 | Bowman | 337/404 |
| 5,097,247 | 3/1992 | Doerrwaechter | 337/405 |
| 5,209,987 | 5/1993 | Penneck et al. | 428/610 |
| 5,280,262 | 1/1994 | Fischer | 337/405 |
| 5,433,956 | 7/1995 | Patel | 424/400 |
| 5,558,701 | 9/1996 | Patel | 106/35 |
| 5,600,295 | 2/1997 | Kaufmann | 337/405 |

*Primary Examiner*—Leo P. Picard
*Assistant Examiner*—Anatoly Vortman
*Attorney, Agent, or Firm*—Brian W. Dodson

[57] ABSTRACT

A new type of high temperature thermal disconnect has been developed to protect electrical and mechanical equipment from damage caused by operation at extreme temperatures. These thermal disconnects allow continuous operation at temperatures ranging from 250° C. to 450° C., while rapidly terminating operation at temperatures 50° C. to 150° C. higher than the continuous operating temperature.

10 Claims, 3 Drawing Sheets

THERMAL DISCONNECT FOR HIGH-TEMPERATURE BATTERIES

This application is a continuation-in-part of an original application Ser. No. 08/950,390, filed on behalf of Jungst, Armijo, and Frear on Oct. 14, 1997, which has not yet issued as a patent. The specification to this original application is hereby included in its entirety by reference. The The government has rights to this invention pursuant to Contract No. DE-AC04-94AL85000 awarded by the U.S. Department of Energy.

BACKGROUND

The present invention relates to apparatuses and methods for protecting high-temperature batteries from extreme thermal excursions.

High temperature batteries have many desirable characteristics, including large energy and power density. However, failure of large batteries (which usually have a serial-parallel architecture) can be triggered by short circuit failures of individual cells. A short-circuited cell within the battery draws considerable amounts of current from other cells within the battery. These circulating currents individually need not be larger than those associated with providing power to an approved external load, but in this failure mode are all directed to heating the faulty cell.

The increased temperature associated with a short-circuited cell can cause nearby cells also to develop short-circuits. As more cells develop shorts, the circulating currents within the battery increases in a non-linear manner, driving temperatures above normal operating levels. This eventually produces a cascade effect of cell failure, and extreme thermal excursions, which can lead to catastrophic failure, including fire and/or release of toxic substances into the general environment.

The failure mode described above for high temperature batteries does not result from excess flow of electrical current, but rather from temperatures within the battery casing which are too high. If a cascade of failures occurs within a limited time, the battery will undergo a thermal meltdown.

It is possible to prevent such cascade failure by placing thermal disconnects between the cells. A thermal disconnect is a device which interrupts a circuit carrying a standard operational current when the environmental temperature exceeds a desired value. Note that this function differs from that of a conventional electrical fuse, which is a device which interrupts a circuit when the circuit carries a current in excess of a standard operational level.

This difference in function leads to key differences in structure. A conventional electrical fuse is intended to reliably permit currents below a rated value to pass, whereas currents a given amount larger than said rated value (typically 125% to 200% of the rated value) will cause the circuit to open. The specified rated value and the opening value are intended to be reliable for a range of operating temperatures.

A conventional electrical fuse comprises a conducting element which undergoes Joule heating from the current passing through the fuse, and hence through the conducting element. The conducting element is in thermal contact with (or may be identical to) a fusible link which has a known melting temperature. The conducting element is designed so that, when the current is equal to or less than the rated value, the temperature of the fusible link is less than its melting temperature. When the current is greater than the rated value, the temperature of the fusible link is greater than its melting temperature, resulting in opening of the circuit in which the fuse is placed.

A thermal disconnect requires additional structure to function as described above. In particular, connection to the circuit, mechanical mounting means, and the like provide thermal contact between the conducting element/fusible link combination and the external environment. For convenience, the structure leading to this thermal contact will be called a thermal link element.

A conventional electrical fuse cannot operate without a thermal link element. If a thermal link element is not present, then Joule heat produced in the conducting element by a current cannot dissipate. As a result, the temperature of the conducting element and the fusible link will steadily increase, eventually reaching the melting temperature of the fusible link. Thus, a conventional electrical fuse which does not have a thermal link element will open under any value of operating current, which is not the desired function.

If the thermal link to the surrounding environment provided by the thermal link element is too large, however, a conventional electrical fuse will again fail to function. This will become clearer if specific design parameters are used.

Consider an electrical fuse which is intended to have a rated value of 20 amperes, has a resistance of 0.1 ohm, is intended to open at a continuous overload of 25 amperes, and has a fusible link which melts at 250° C. The environmental temperature of the apparatus is 25° C. The Joule heating in the conducting element at the rated value is $I^2R$, or 40 watts, whereas at the opening value the Joule heating is 62.5 watts. The thermal link element has a thermal conductance K, expressed in units of ° C./watt, and the thermal power leaving the conducting element is K(T−t), where T is the temperature of the environment and t is the temperature of the conducting element. The equilibrium temperature of the conducting element is attained when the Joule heating is equal to the thermal power.

A current of the opening value must correspond to a conducting element temperature t greater than or equal to 250° C., whereas a current of the rated value must give $t<250°$ C. These requirements combined result in the design criterion $40K<225\leqq 62.5K$. K must therefore be between roughly 3.6 and 5.6° C./watt. Note that at the smallest physically permissible value of K, the conducting element temperature at the rated current is about 170° C., a considerable increase from the temperature of the surrounding environment. This increase under rated conditions is unavoidable in practical electrical fuses.

An electrical fuse which does not include in its structure a thermal link element of appropriate magnitude cannot function.

A thermal disconnect can be made which has a conducting element comprising a compound which melts above a given temperature T. and a thermal link element. However, the thermal link element for a thermal disconnect must be designed differently than that of an electrical fuse. This difference in design is sufficient that, in general, an electrical fuse cannot be used as a thermal disconnect, and vice versa.

Examine how a thermal disconnect must be designed. The intended function of a thermal disconnect is to open an electrical circuit when the temperature of the surrounding environment exceeds a design value T, essentially independent of the amount of current passing through the circuit. The simplest design consonant with this intended function is a fusible link through which the current of the electrical current flows and which melts at a temperature T, and a thermal link between the fusible link and the surrounding environment strong enough that the temperature of the fusible link is essentially independent of the amount of current flowing through the circuit.

This latter requirement is needed to prevent the operating conditions of the electrical circuit from causing the thermal disconnect to open below its operating temperature. It also clearly prevents such a thermal disconnect from operating as an electrical fuse.

To summarize, a thermal disconnect must have a structure producing a very strong thermal link between a fusible link and the surrounding environment, whereas an electrical fuse must have a structure producing a vastly weaker thermal link between a fusible link and the surrounding environment. This is a difference in scale, but one which produces a qualitatively different type of behavior.

There is a need for a new type of thermal disconnect suitable for application in high temperature batteries. This typically requires breaking an electrical circuit upon a component of a high temperature battery reaching a temperature indicative of failure of the component. In typical high temperature batteries this temperature is roughly between 400 and 500° C.

A primary advantage is that a thermal disconnect according to the present invention is inexpensive in comparison to the total cost of a high temperature battery and in comparison to competing devices.

SUMMARY

The present invention is of a thermal disconnect comprising current leads, a fusible link through which the current passes, and a thermal link element providing thermal contact between the fusible link and the environment surrounding the thermal disconnect. The fusible link is preferably made of a material which conducts electricity, which melts at the rated temperature of the thermal disconnect, and which opens the current path through the thermal disconnect upon melting. The thermal link element provides strong enough thermal contact that Joule heating within the thermal disconnect does not significantly affect the temperature of the fusible link. The invention is also of an improvement to high temperature batteries comprising such a thermal disconnect.

In the preferred embodiment, the fusible link melts at a temperature roughly between 400 and 500° C., and conducts current substantially without degrading at temperatures between approximately 0° C. and 400° C. The fusible link may be coated (as with a sol-gel) to reduce chemical reaction with environmental matter.

DETAILED DESCRIPTION

The thermal disconnect of the present invention conducts an electrical current as long as the environmental temperature remains below a rated value. Once the environmental temperature exceeds the rated value, a fusible material melts and renders the thermal disconnect nonconductive. This can occur in several manners.

Figure 1:
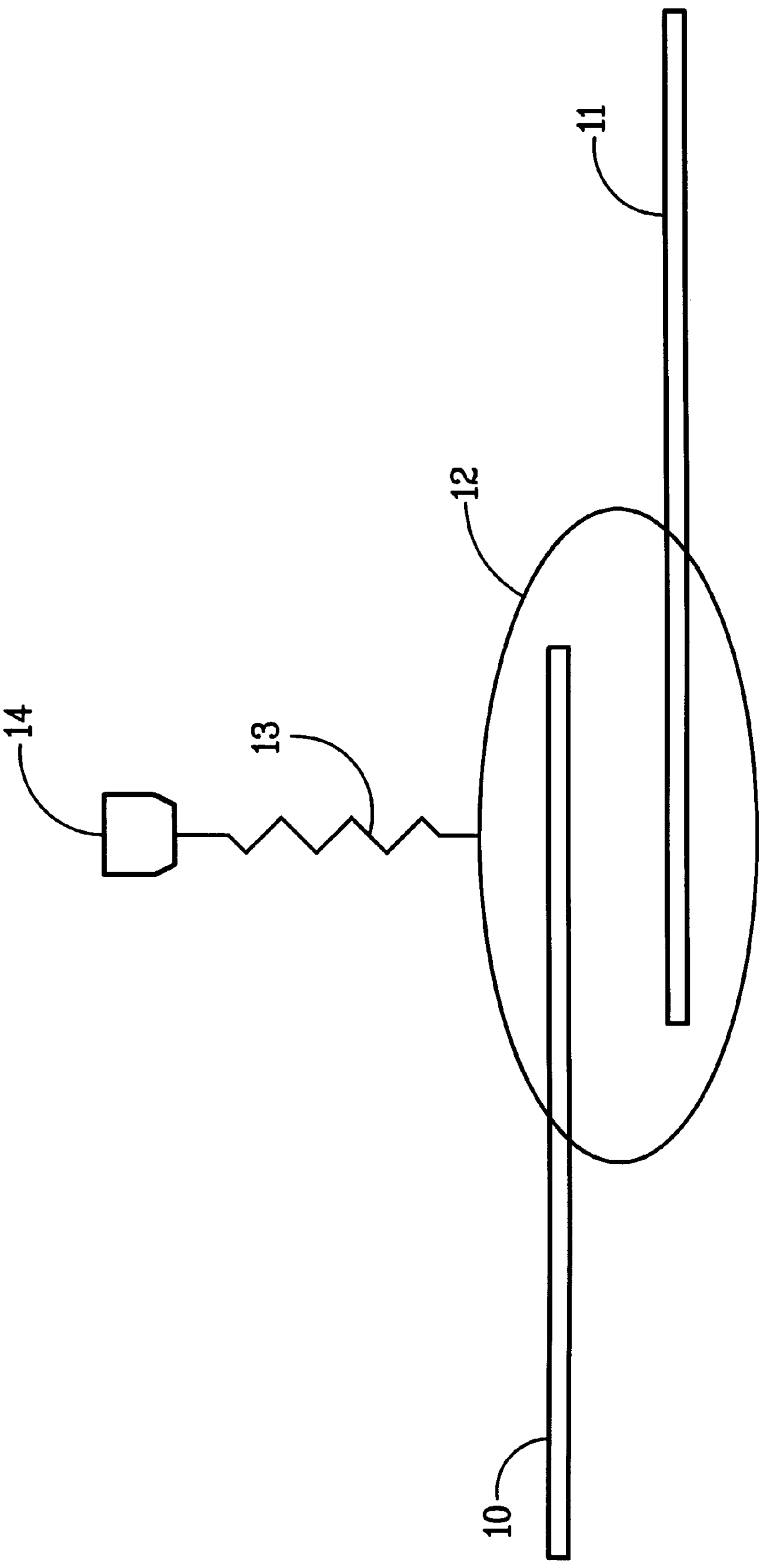
FIG. 1 is a schematic illustration of a thermal disconnect according to the present invention.

In the implementation shown in FIG. 1, two contact leads 10 and 11 are coupled by a fusible material 12 which is electrically conductive and melts at a rated temperature T. The fusible material 12 is linked to the temperature of the external environment 14 via a thermal link element 13. The thermal link element 13 provides strong enough thermal contact that Joule heating within the leads or the fusible material does not significantly affect the temperature of the fusible material. An optional coating 15 can be placed about the elements of the thermal disconnect to provide protection against degradation caused by chemical reaction with environmental chemicals. The leads and the fusible material are so disposed that the connection between the leads is broken when the fusible material melts.

Figure 2:
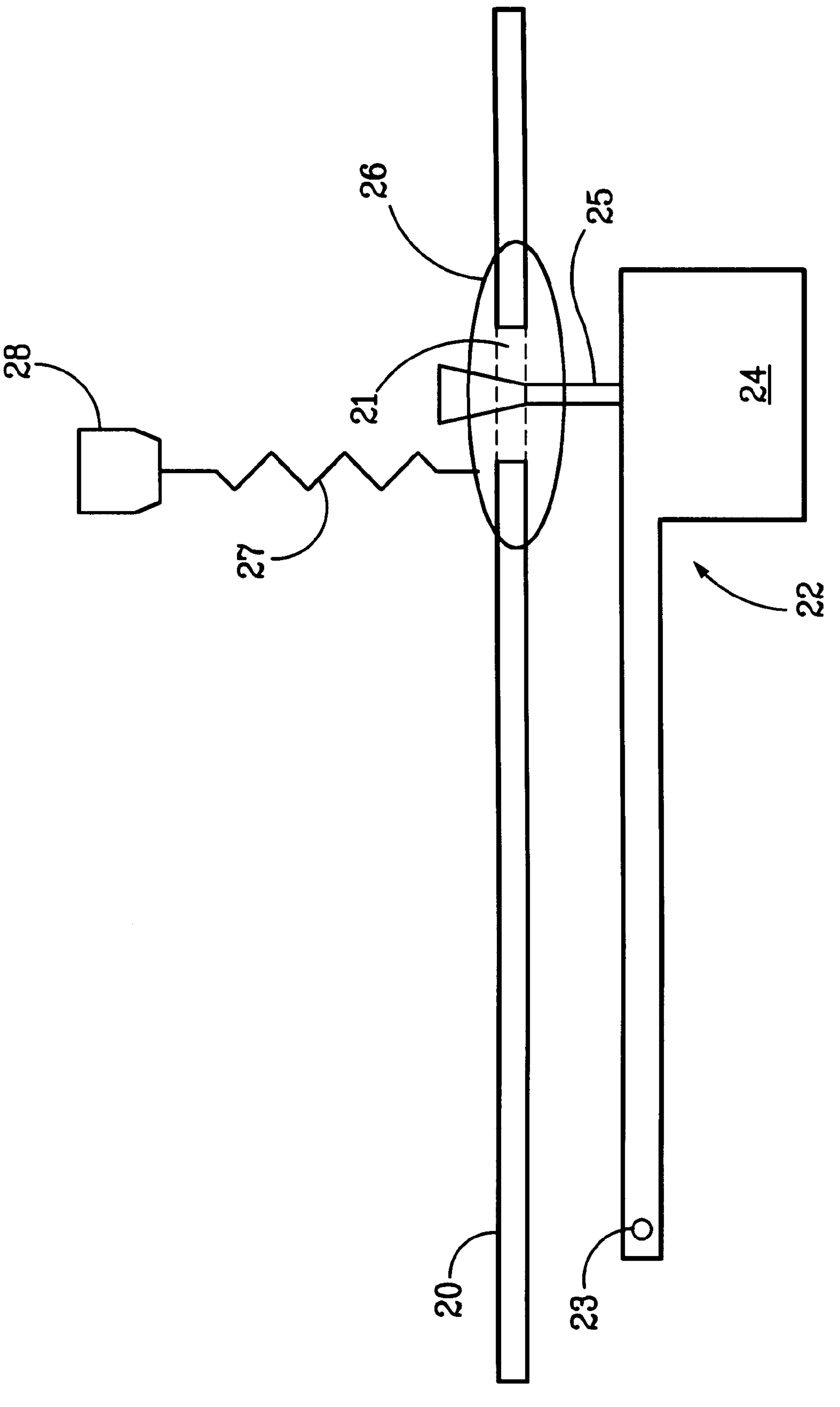
FIG. 2 is a schematic illustration of a gravity-driven thermal disconnect according to the present invention.

The implementation of FIG. 2 is for a gravity-driven thermal disconnect. A fixed contact lead 20 with a perforation 21 is positioned above a pivoting contact lead 22 comprising a pivot point 23, a weight 24, and a contact pin 25. The pivoting contact lead is positioned so that the contact pin 25 penetrates perforation 21 from below. Contact pin 25 is held in place by a fusible material 26, which also makes electrical contact between the fixed and pivoting contact leads and melts at a rated temperature T. The end of contact pin 25 which penetrates perforation 21 can be expanded, or given special structure, such as texture (knurling, rings, threads, etc.) to prevent the contact pin from sliding through the grip of the fusible material 26 under mechanical load.

The fusible material 26 is linked to the temperature of the external environment 28 via a thermal link element 27. The thermal link element 27 provides strong enough thermal contact that Joule heating within the leads or the fusible material does not significantly affect the temperature of the fusible material. When the fusible material melts, gravity forces the contact leads to move apart, preventing residual fusible material from maintaining electrical contact.

Figure 3:
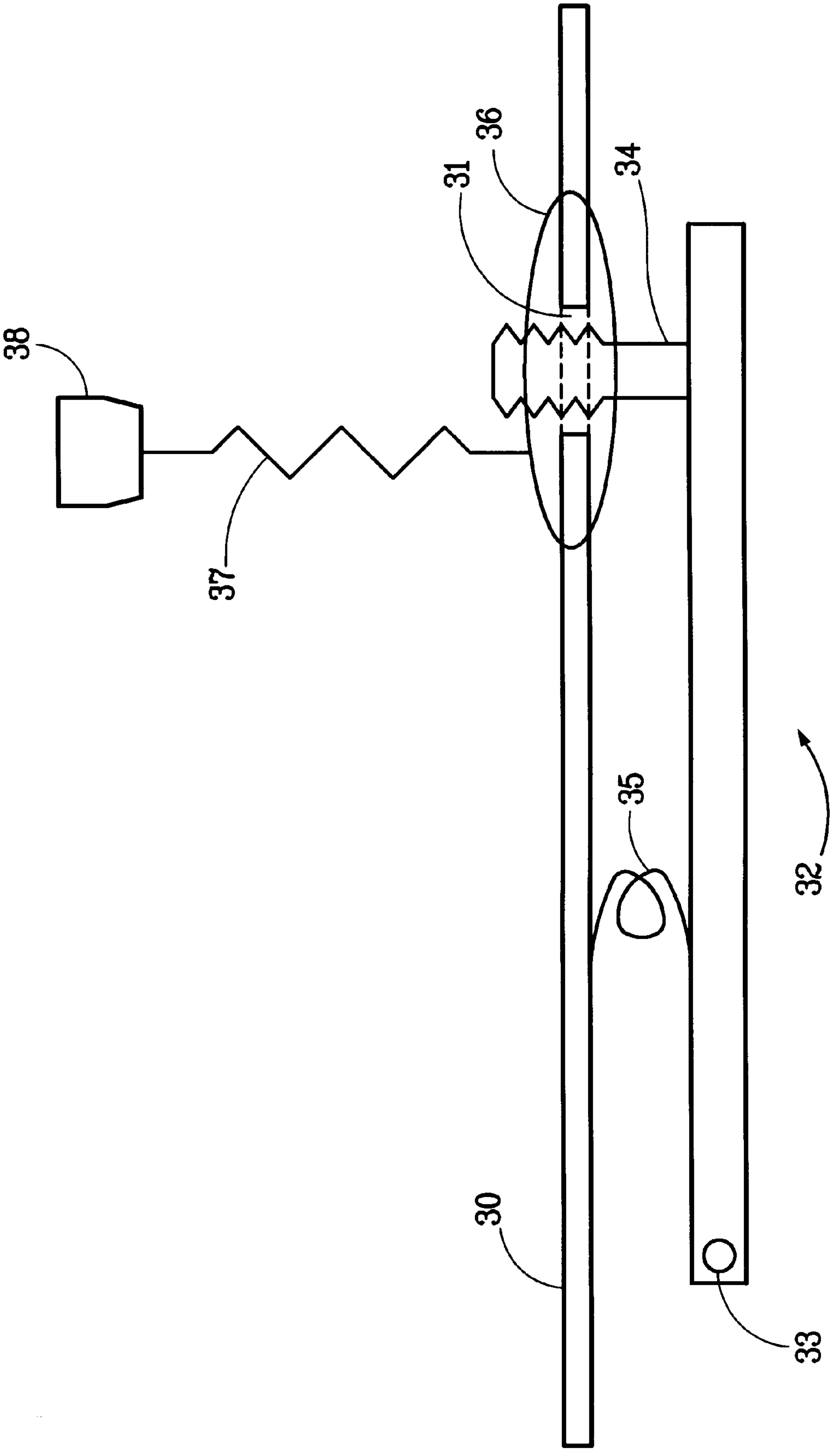
FIG. 3 is a schematic illustration of a spring-loaded thermal disconnect according to the present invention.

The implementation of FIG. 3 is for a spring-driven thermal disconnect. A pivoting contact lead 32, comprising a pivot point 33 and a contact pin 34, is positioned in functional relation to a fixed contact lead 30 comprising a perforation 31 such that contact pin 34 penetrates perforation 31. Contact pin 34 is held in place against the force of spring 35 by a fusible material 36, which also makes electrical contact between the fixed and pivoting contact leads and melts at a rated temperature T. The end of contact pin 34 which penetrates perforation 31 can be expanded, or given special structure, such as texture (knurling, rings, threads, etc.) to prevent the contact pin from sliding through the grip of the fusible material 36 under mechanical load.

The fusible material 36 is linked to the temperature of the external environment 38 via a thermal link element 37. The thermal link element 37 provides strong enough thermal contact that Joule heating within the leads or the fusible material does not significantly affect the temperature of the fusible material. When the fusible material melts, spring 35 forces the contact leads to move apart, preventing residual fusible material from maintaining electrical contact.

The fusible material preferably has certain properties which allow it to function properly in the environment of a high temperature battery. It should have a high electrical conductivity in the solid state, melt at a temperature below the damage threshold of the battery cells, not degrade at normal battery operating temperatures, have a low enough viscosity in the liquid state to allow device function, and be reasonably inexpensive (hundreds of thermal disconnects can be required to properly protect a single battery).

Typical operating conditions for high temperature batteries include an normal operating temperature in the range of 250–400° C., and a damage threshold of 400–525° C. These requirements are not met by any pure material—hence an appropriate alloy or alloys must be engineered for the purpose. As zinc comes closest, a wide number of zinc alloys can be found that are suited to application in the present invention.

Note that although the context of the present discussion is thermal disconnects for use in high temperature batteries, they can in fact be used in a wide range of electrical and mechanical equipment which operates at high temperature. Examples include, but are not limited to, transformers, electrical motors, internal and external combustion engines, gas turbine generators, and jet and rocket motors.

Fortunately, a wide range of alloys are available for such applications. Eutectic alloys are useful because they transition essentially instantly between the solid state and a low-viscosity liquid state, thus allowing decisive device operation.

Noneutectic alloys can be used, but typically pass through a plastic mixed phase regime in a temperature region around the nominal melting point. Such plastic material has a large viscosity, and may not function properly in a thermal disconnect after FIG. 1. This distinction is probably not important for the gravity-driven or spring-loaded thermal disconnects.

A second difficulty with noneutectic alloys involves the possibility of phase separation at temperatures below the melting point. If the alloy chosen is sufficiently different in composition from the eutectic value, phase separation can occur at the intended battery operating temperature. Such phase separation can lead to degradation of the electrical properties of the thermal disconnect.

Binary alloys which are suited to application in the present invention include the Ag—Mg, Ag—Sb, Al—Ge, Al—Mg, Au—In, Bi—Te, Cd—Sb, Cu—Mg, In—Sb, Mg—Pb, Pb—Pd, Sb—Zn, and Sn—Te alloy systems. For the reasons mentioned above, the eutectic alloys of these systems are often the best choices.

Binary alloys particularly suited to the present application include those having the approximate compositions (indicated by weight percentages) Sb—Cd (59–41%), Sb—Zn (78–22%), Pb—Mg (67–33%), and Sb—Sn (64–36%). Other suitable binary alloys have the approximate compositions Ag—Mg (48–52%), Ag—Sb (56–44%), Al—Ge (47–53%), Au—In (73–27%), Bi—Te (85–15%), Cu—Mg (31–69%), In—Sb (30–70%), Pb—Pd (75–25%), Sn—Te (15–85%), and Mg—Al (68–32%).

Ternary and more complex alloys can also be used in the present invention, subject to the same requirements and limitations as outlined above.

Although the invention has been described in detail with particular reference to particular embodiments, other embodiments can achieve the same results. Variations and modifications of the present invention will be obvious to those skilled in the art, and it is intended to cover in the appended claims all such modifications and equivalents.

What is claimed is:

1. A thermal disconnect with a rated temperature T comprising:

a) a first electrically conducting contact lead;

b) a second electrically conducting contact lead, comprising a weight disposed so as to force apart the first and second contact leads when the fusible link melts;

c) a fusible link connecting said first and second contact leads, said link comprising a material which is electrically conducting and with a melting temperature approximately equal to T; and, d) a thermal link element providing thermal contact between the fusible link and the external environment of the thermal disconnect so that Joule heating within the contact leads or the fusible link does not significantly affect the temperature of the fusible link.

2. The thermal disconnect of claim 1, wherein said first contact lead is fixed, and said second contact lead comprises a pivot point, a weighted bar, and a contact pin, so disposed so that said contact pin is connected to the first contact lead by the fusible link, and so that when the fusible link melts, the second contact lead pivots about said pivot point.

3. The thermal disconnect of claim 2, wherein said first contact lead is perforated, said contact pin penetrating said perforation while the fusible link remains solid.

4. The thermal disconnect of claim 3, wherein the end of said contact pin which penetrates said perforation is textured.

5. The thermal disconnect of claim 3, wherein the end of said contact pin which penetrates said perforation is wider than the rest of said contact pin.

6. A thermal disconnect with a rated temperature T comprising:

a) a first electrically conducting contact lead;

b) a second electrically conducting contact lead, comprising a pivot point and a contact pin;

c) a fusible link connecting said first contact lead and said contact pin, said link comprising a material which is electrically conducting and with a melting temperature approximately equal to T;

d) a spring disposed so as to force apart the first contact leads and the contact pin when the fusible link melts; and, e) a thermal link element providing thermal contact between the fusible link and the external environment of the thermal disconnect so that Joule heating within the contact leads or the fusible link does not significantly affect the temperature of the fusible link.

7. The thermal disconnect of claim 6, wherein said first contact lead is perforated, said contact pin penetrating said perforation while the fusible link remains solid.

8. The thermal disconnect of claim 7, wherein the end of said contact pin which penetrates said perforation is textured.

9. The thermal disconnect of claim 7, wherein the end of said contact pin which penetrates said perforation is wider than the rest of said contact pin.

10. A high-temperature thermal battery comprising a thermal disconnect with a rated temperature T between 400° C. and 500° C., comprising:

a) a first electrically conducting contact lead;

b) a second electrically conducting contact lead, comprising a weight disposed so as to force apart the first and second contact leads when the fusible link melts;

c) a fusible link connecting said first and second contact leads, said link comprising a material which is electrically conducting and with a melting temperature approximately equal to T, such that said thermal disconnect conducts current substantially without degradation at temperatures less than 50° C. below the rater temperature, and, d) a thermal link element providing thermal contact between the fusible link and the external environment of the thermal disconnect so that Joule heating within the contact leads or the fusible link does not significantly affect the temperature of the fusible link.

* * * * *